United States Patent
Lee (10) Patent No.: US 10,149,187 B2
(45) Date of Patent: Dec. 4, 2018

(54) METHOD FOR CONTROLLING ACCESS POINT OPERATION IN WIRELESS COMMUNICATION SYSTEM

(71) Applicant: Samsung Electronics Co., Ltd., Suwon-si, Gyeonggi-do (KR)

(72) Inventor: Heekoung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 14/936,076

(22) Filed: Nov. 9, 2015

(65) Prior Publication Data

US 2016/0142967 A1    May 19, 2016

(30) Foreign Application Priority Data

Nov. 17, 2014 (KR) .................. 10-2014-0159866

(51) Int. Cl.
*H04W 4/00* (2018.01)
*H04W 24/08* (2009.01)
*H04W 88/12* (2009.01)
*H04W 84/12* (2009.01)
*H04W 88/08* (2009.01)

(52) U.S. Cl.
CPC ............ *H04W 24/08* (2013.01); *H04W 84/12* (2013.01); *H04W 88/08* (2013.01); *H04W 88/12* (2013.01)

(58) Field of Classification Search
CPC ..... H04W 24/02; H04W 24/04; H04W 24/08; H04W 36/08; H04W 84/12; H04W 88/08; H04W 88/12
See application file for complete search history.

(56) References Cited

U.S. PATENT DOCUMENTS

| | | | |
|---|---|---|---|
| 7,301,926 B1 | 11/2007 | Dietrich et al. | |
| 2004/0203855 A1 | 10/2004 | Veerasamy et al. | |
| 2007/0217360 A1 | 9/2007 | Tang | |
| 2008/0032727 A1 | 2/2008 | Stephenson et al. | |
| 2010/0091746 A1 | 4/2010 | Li et al. | |
| 2011/0212720 A1* | 9/2011 | Hamalainen | H04W 24/02 455/423 |
| 2012/0127876 A1 | 5/2012 | Hunukumbure et al. | |
| 2014/0171082 A1* | 6/2014 | Smadi | H04W 36/08 455/436 |
| 2016/0242049 A1* | 8/2016 | Centonza | H04W 24/02 |

* cited by examiner

*Primary Examiner* — Kevin C. Harper
(74) *Attorney, Agent, or Firm* — Jefferson IP Law, LLP (57) ABSTRACT

An access point (AP) operation control method of an AP in a wireless local area network (WLAN) system and an apparatus therefor are provided. The method includes receiving connection related information with respect to the AP and at least one terminal, based on the connection related information, determining whether the AP is a dummy AP, and based on a result of the determination, performing a coverage hole detection and correction related operation for the AP. Also, provided are a method and an apparatus for operating an AP controlled by an AP controller (APC).

20 Claims, 8 Drawing Sheets

METHOD FOR CONTROLLING ACCESS POINT OPERATION IN WIRELESS COMMUNICATION SYSTEM

CROSS-REFERENCE TO RELATED APPLICATION

This application claims the benefit under 35 U.S.C. § 119(a) of a Korean patent application filed on Nov. 17, 2014 in the Korean Intellectual Property Office and assigned Serial number 10-2014-0159866, the entire disclosure of which is hereby incorporated by reference.

TECHNICAL FIELD

The present disclosure relates to a method and an apparatus for controlling an operation of an access point (AP) in a wireless communication system. In addition, the present disclosure relates to a method and an apparatus for controlling a transmission power of a wireless local area network (WLAN) AP.

BACKGROUND

Various wireless communication technologies are being developed along with a development of recent information communication technologies. In the wireless communication technologies, a wireless local area network (WLAN) is a technology which facilitates wireless access to the Internet in a home, a company, or a predetermined service area, based on a wireless frequency technology, using a portable terminal such as a cellular phone, a terminal, a user device, a personal digital assistant (PDA), a laptop computer, or a portable multimedia player (PMP).

Since the establishment of the Standards Organization of WLAN technology, Institute of Electrical and Electronics Engineers (IEEE) 802, in February 1980, a number of standardization processes have been performed. Through IEEE 802.11, the initial WLAN technology has used a 2.4 GHz frequency supporting speed of 1~2 Mbps through a frequency hopping, a spread spectrum, an infrared (IR) communication, etc., and since then the recent WLAN technology, to which orthogonal frequency division multiplex (OFDM) is applied, may support the maximum speed of 54 Mbps. In addition, IEEE 802.11 is practicalizing or developing standards of various technologies such as improvement of quality for service (QoS), access point (AP) protocol compatibility, security enhancement, radio resource measurement, wireless access vehicular environment, fast roaming, mesh network, interworking with external networks, and wireless network management.

A recent wireless environment of enterprise is facing a change to a new paradigm referred to as the Age of the Smart Device, and accordingly the importance of WLAN technology has been strengthened. Until now, a WLAN has been mainly positioned as a complement to a wired environment. In such an environment, the WLAN had a problem caused by an interference with other wireless device, a speed limit problem, a security problem and the like. To deal with such problems, more studies and investments are underway for an interference avoidance technology, a performance improvement technology, and security by WLAN operators.

Meanwhile, in a wireless environment like WLAN, multiple APs comprise the wireless environment. In constructing the wireless environment using multiple APs and in case which a specific AP not operating normally, a coverage hole may occur. In this case, a method to detect and control the coverage hole may be used to improve stability of the overall system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for controlling an access point (AP) operation in a wireless communication system to solve the problems stated hereinbefore. In addition, an embodiment of the present disclosure provides a method and an apparatus for controlling a transmission power of a wireless local area network (WLAN) AP. Further, an embodiment of the present disclosure provides a method and an apparatus to detect and correct a coverage hole through controlling a transmission power of a WLAN AP.

In accordance with an aspect of the present disclosure, a method for controlling an AP operation of an AP controller (APC) in a WLAN system is provided. The method includes the operations of receiving connection related information with respect to the AP and at least one terminal, based on the connection related information, determining whether the AP is a dummy AP, and based on a result of the determination, performing a coverage hole detection and correction (CHDC) related operation for the AP.

In accordance with another aspect of the present disclosure, an apparatus of an AP controller for controlling an AP operation in a WLAN system is provided. The apparatus includes a communication unit configured to perform a communication with at least one AP, and an AP operation controller configured to control to receive connection related information for the AP with at least one terminal, determine whether the AP is a dummy AP based on the connection related information, and perform a CHDC related operation for the AP, based on a result of the determination.

In accordance with another aspect of the present disclosure, a method for operation of an AP in a WLAN system is provided. The method includes the operations of storing connection related information for at least one terminal related to the AP, based on the connection related information, determining whether the AP is a dummy AP, and based on a result of the determination, transmitting information indicating whether the AP is a dummy AP, to an APC.

In accordance with another aspect of the present disclosure, an apparatus of an AP on a WLAN system is provided. The apparatus includes a communication unit configured to perform a communication with at least one network node, and a controller configured to control to store connection related information for at least one terminal related to the AP, and determine whether the AP is a dummy AP based on the connection related information, the communication unit transmitting, based on a result of the determination, information indicating whether the AP is a dummy AP to an APC.

According to an embodiment of the present disclosure, a method and an apparatus for controlling an operation of an AP in a wireless communication system are provided. Particularly, according to an embodiment of the present disclosure, a method and an apparatus for controlling a transmission power of a WLAN AP related to CHDC are provided.

According to an embodiment of the present disclosure, a WLAN system identifies a WLAN AP (edge WLAN AP) in a location where signal strength of a terminal is inevitably and drastically reduced and takes measures to solve a problem in which CHDC frequently occurs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In an embodiment of the present disclosure, a wireless local area network (WLAN) refers to a scheme for establishing a network between electronic devices using electric waves instead of a series of cables such as a conventional network cable or a normal telephone line. For example, the WLAN may be a WiFi.

In an embodiment of the present disclosure, a terminal may be referred to as user equipment (UE), a terminal, or a station (STA).

In an embodiment of the present disclosure, a coverage hole may signify a case or a location in which a terminal cannot receive a wireless signal transmitted by an access point (AP), in areas configured as wireless network coverage. In this case, "cannot receive a wireless signal" may include the case in which the strength of the wireless signal to be transmitted is not suitable for a wireless communication. For example, when a signal-to-noise ratio or receiving signal strength does not satisfy a preconfigured condition, the signal strength may be determined to be unsuitable for the wireless communication.

In an embodiment of the present disclosure, a WLAN AP signifies a low power wireless device performing as a base STA in a WLAN system. Unless otherwise noted in an embodiment of the present disclosure, an AP means a WLAN AP. Also, an AP may refer to an access point. An AP may perform as a bridge to connect the wired and wireless devices. For example, an AP may be connected with an AP controller (APC) through a wired interface, and perform a wireless communication with at least one terminal through a wireless interface. In terms of a wired network, the AP may be connected to a router, a switch, or the like. In a WLAN system, the router or the switch cannot recognize the terminal and the recognition of the terminal is dependent entirely on the AP. Therefore, the AP in the WLAN system performs to expand a wired network to a wireless network in the WLAN system.

Figure 1:
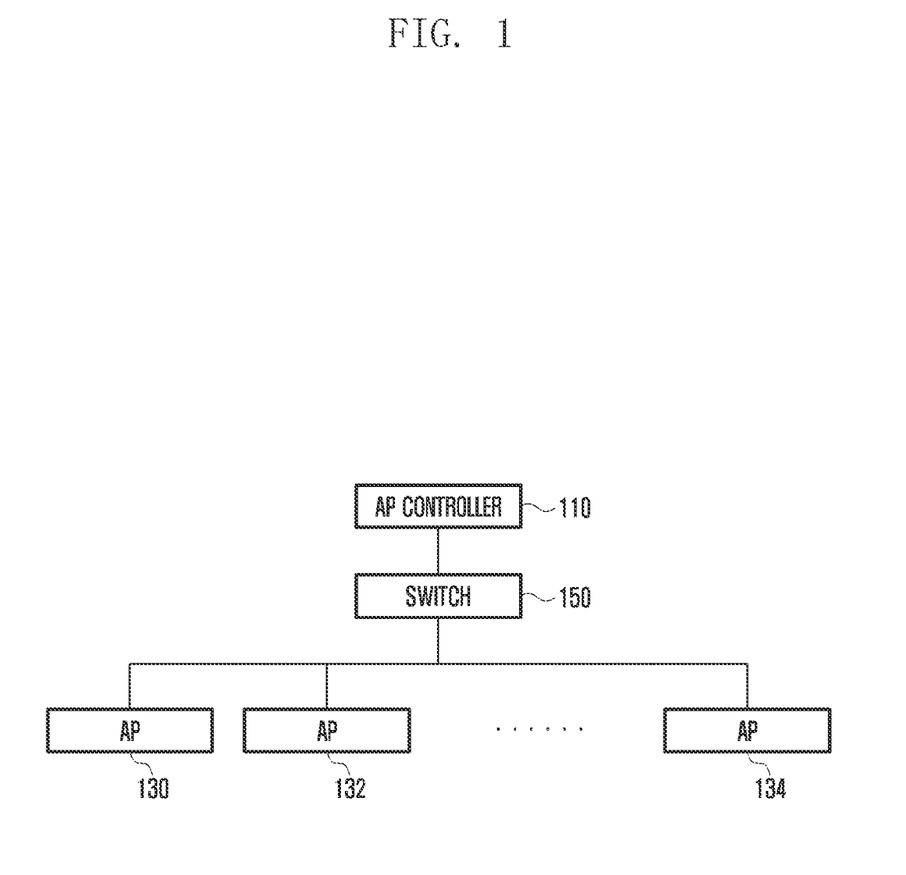
FIG. 1 illustrates a wireless communication system according to an embodiment of the present disclosure.

FIG. 1 illustrates a wireless communication system according to an embodiment of the present disclosure.

Referring to FIG. 1, a wireless communication system in an embodiment of the present disclosure may include an APC 110, and APs 130, 132, and 134. The wireless communication system may further include a switch 150 for connecting the APC 110 with at least one of APs 130, 132, and 134. The switch may be a power over ethernet (PoE) switch. The switch 150 facilitates stable supply of power to the AP 130, 132, 134, thereby allowing performance of a stable communication. Hereinafter, unless each AP of FIG. 1 is distinguished, reference numeral 130 will be used for an AP.

The wireless communication system may include two or more APs 130. The APC 110 may control each AP 130, 132, and 134. The APC 110 may control the configuration of the AP 130. For example, the APC 110 may detect an interference on at least one AP 130 under the control thereof and control to reduce the interference. In order to control the interference, a radio frequency (RF) power of the AP 130 may be controlled or a resource allocation may be controlled. In addition, the APC 110 may control a load on the AP 130. Through load balancing on the AP 130, the APC 110 can efficiently manage coverage and improve a communication quality. Further, the APC 110 may perform a coverage hole detection and correction (CHDC) operation. An APC 110 may control and adjust the coverage of a corresponding AP by controlling a transmission power of the AP 130.

As a low power wireless device working as a base STA in a WLAN, an AP 130 performs a coordinator role in a basic service set (BSS). That is, the AP 130 provides synchronization with a terminal, a power control, a medium access control, etc. within one BSS. Further, in an extended SS (ESS) comprising two or more BSS areas, APs 130, 132, and 134 perform a bridging role between corresponding BSSs, respectively, thereby enabling roaming between APs 130, 132, and 134.

A service set identification (SSID) may be allocated to each AP 130. An SSID is an ID configured to provide a distinction among wireless networks. Having an identical SSID may be interpreted as using the identical network. In addition, a basic SSID (BSSID) may be configured for each AP 130. A BBSID signifies an environment in which an AP and wireless terminals communicate within a wireless area (coverage) transmitted by one AP. A BSSID may signify a medium access control (MAC) address of an AP. Having an identical BSSID may be interpreted as different terminals being connected to a same AP.

Referring to FIG. 1, in a WLAN environment under the control of a certain APC 110, a data communication may be performed using at least one AP. In addition, in a wireless environment outside the range of the APC 110, a communication through a cellular network or a WLAN communication through another APC may be available. The cellular network may include $2^{nd}$-generation (2G), 3G, and 4G networks. A handoff may occur between the WLAN environment and the cellular network, and the handoff may be available among a plurality of APs 130, 132, and 134 under the APC 110. Handoff and handover may be used for the same meaning. The APC 110 controls the AP 130 and may support a terminal communicating through the AP 130 to perform a handover.

Figure 2:
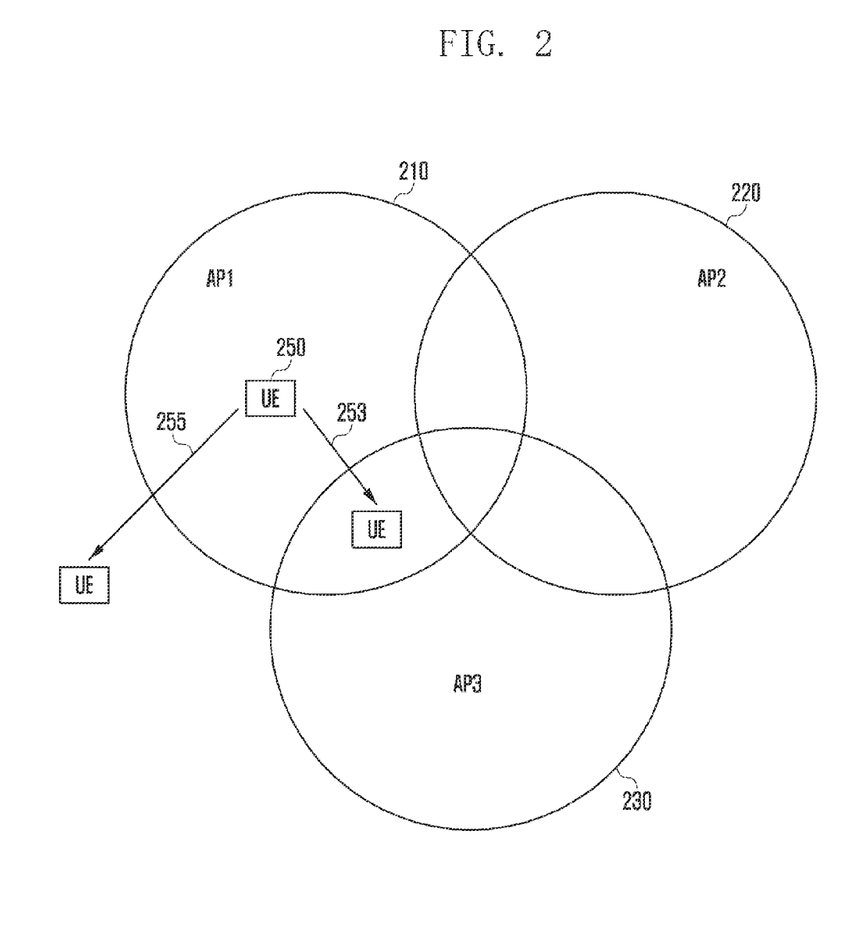
FIG. 2 illustrates a coverage and a handover of a wireless local area network (WLAN) system according to an embodiment of the present disclosure.

FIG. 2 illustrates a coverage and a handover of a WLAN system according to an embodiment of the present disclosure.

Referring to FIG. 2, AP 1, AP 2, and AP3 form coverages 210, 220, and 230 corresponding to APs, respectively. AP 1, AP 2, and AP 3 are assumed to be connected to the same APC. In addition, an area outside the range of the coverage 210, 220, and 230 is assumed to be a WLAN network or a cellular network under the control of another APC.

A coverage is a communication available area in which each AP may perform a communication with each terminal Within a coverage, each AP and at least one terminal may perform a communication. The range of a coverage may change depending on a transmission power of an AP. For example, a coverage can be enlarged when a transmission power of an AP increases, and a coverage can be reduced when a transmission power of the AP decreases. When a plurality of APs form a WLAN system, controlling a coverage of each AP to prevent a coverage hole from being generated may be performed, and when the transmission power is increased to prevent the coverage hole from being generated, since an interference may occur between different APs, coverage management may be performed through a suitable transmission power control.

In a WLAN system, an AP is displaced to cover, at least, a configured area in a building. An APC may communicate with the AP; control the coverage of the AP, a load, an interference, etc., and perform a handover or a roaming when a terminal communicating with the AP is moving. When the terminal moves to a service coverage of a cellular network outside of the coverage of the APC, a handover between different kinds of networks may occur.

In FIG. 2, a terminal 250 may perform a communication through a WLAN network in the coverage 210 of AP 1. When the terminal 250 moves, from the coverage of the AP in which the terminal is currently located, to the edge of the coverage, the terminal 250 may perform a handover. The terminal 250 may determine whether signal strength equal to or above a configured threshold value is received during a preconfigured time thereby determining an occurrence of a handover.

For example, the terminal 250 may move in the same direction as a reference numeral 253. When the terminal 250 moves this way, the terminal gradually moves away from the center of the coverage 210 of AP 1 and moves closer to the coverage 230 of AP 3. When received signal strength indication (RSSI) received from AP 1 by the terminal 250 gradually decreases and received signal strength indication received from AP 3 by the terminal 250 gradually increases, the terminal 250 may perform the handover from AP 1 to AP 3. Similarly, the terminal 250 may move in the same direction as a reference numeral 255. When the terminal 250 moves this way, the terminal gradually moves away from the center of the coverage 210 of AP 1 and may move closer to a coverage of a cellular network or a coverage of a WLAN network controlled by another APC. Before the terminal 250 moves outside of the coverage of AP 1, the terminal may perform a handover to the coverage of the cellular network or the coverage of the WLAN network controlled by another APC.

Meanwhile, the terminal 250 in the edge of the coverage has a high possibility of a handover according to mobility, but the handover may fail when a wireless environment changes rapidly. In addition, when the wireless environment changes rapidly, an idle time-out phenomenon which is a disconnection between the terminal 250 and the AP without a handover may occur.

An APC may control a plurality of APs and form, through multiple coverages of APs 210, 220, and 230, a WLAN network by the same APC. In the wireless network, maintaining a coverage, an interference, and a communication quality by properly controlling each WLAN AP may be performed. To this end, actively controlling the AP may be performed according to a change of wireless environment after the establishment of the WLAN network. Without succeeding in dealing with an additional change of the wireless environment, a successful WLAN environment cannot be established. In order to control the WLAN environment, a transmission power of a WLAN AP may be controlled and a channel may be changed. Further, for a voice environment, a cell configuration and coverage may be optimized considering the characteristics of a smart terminal.

The APC may perform a dynamic RF configuration control and optimization. Generally, since an AP provides a service through a WLAN service module for 2.4 GHz and 5 GHz, not only the status of a channel in use but the status of the other channel can be monitored in order to monitor the status of a channel not in service. WiFi data (RSSI, channel, utilization, etc.) can be collected through the monitoring. Using the information data received through the monitoring, a channel and a transmission power can be automatically optimized thereby minimizing same-channel interference and maximizing efficiency. Through measuring an RSSI value of a peripheral AP and a terminal, the transmission power of the AP is optimized and an influence to the peripheral AP and the terminal can be minimized.

In addition, an APC may discover an AP in a sleep state. The AP in a sleep state refers to an AP which appears to be normal but is not in service. When an AP in a sleep state is discovered, the AP in a sleep state may be controlled to be rebooted so as to operate in a normal state.

Further, an APC may manage a WLAN environment through a CHDC. During an installation process after an initial cell designing, when a change occurs in an RF environment by various reasons such as a partition modification, a shade area may be detected.

An occurrence of a WLAN service shade area may be detected by collecting and analyzing statistical information through an uplink and downlink service quality, using an RSSI retransmission rate of a terminal connected to each AP. If the shade area occurs, the APC generates an alarm, increases a TX power of the AP, and expands the coverage thereby making an attempt to improve the quality of the downlink. If the alarm is not turned off even when the TX power is increased, it signifies that the uplink quality condition is not satisfied, and therefore, the APC may inspect the status of a network or the terminal in use to check whether a network redesign according to an environment change should be performed and identify a presence of other causes.

Figure 3:
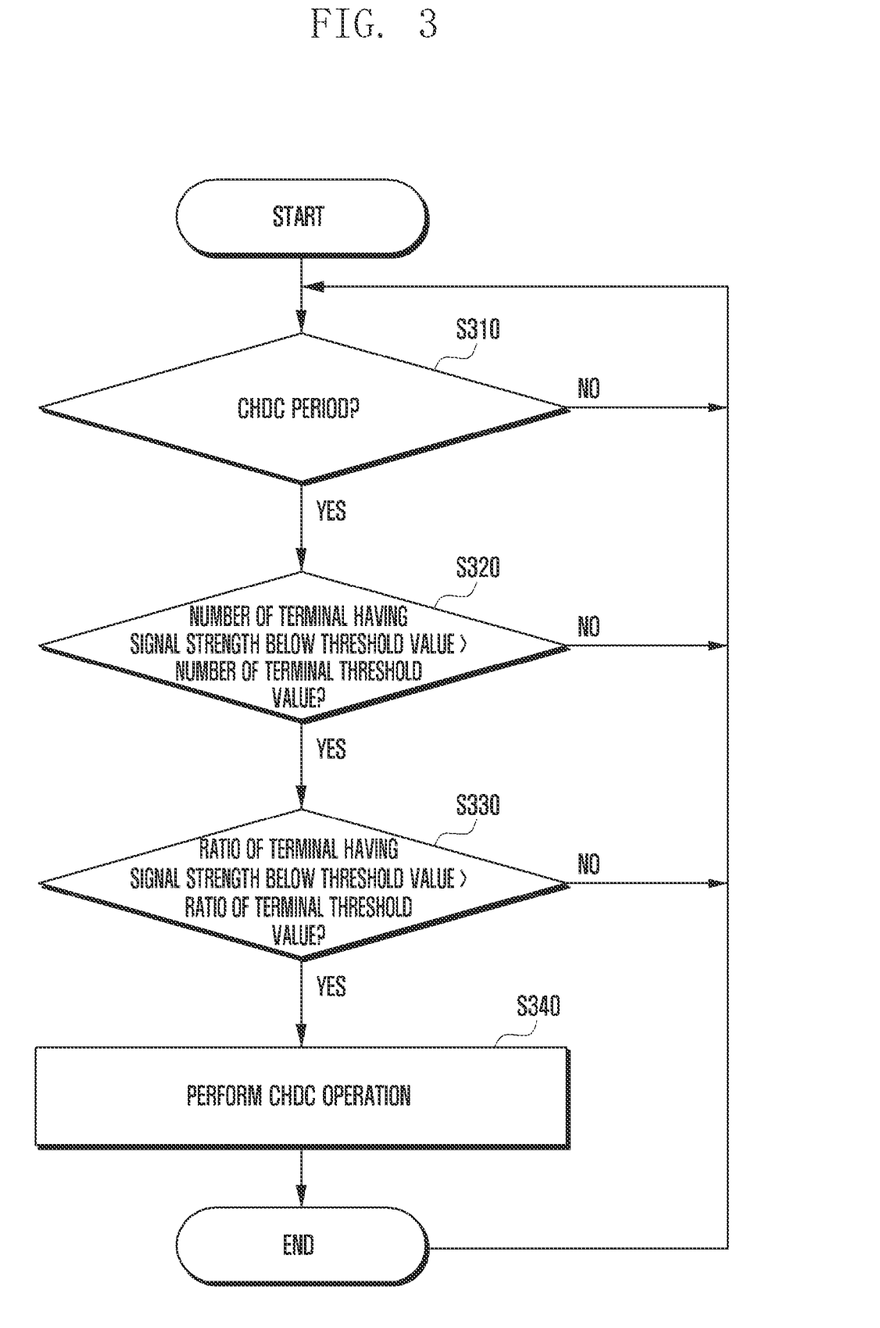
FIG. 3 is illustrates a transmission power control method according to an embodiment of the present disclosure.

FIG. 3 illustrates a transmission power control method according to an embodiment of the present disclosure.

Referring to FIG. 3, a method for changing a transmission power of an AP is set forth when a wireless environment changes according to an embodiment of the present disclosure. For example, the change of the wireless environment may be detecting of a coverage hole. First, an operation of an APC is set forth.

The APC determines whether a CHDC period is occurring in S310. It may be inefficient and a load on the APC or the AP to monitor an occurrence of the coverage hole all the time. Therefore, an efficient system operation is available by performing the following operation whenever the CHDC period comes around.

In the period of CHDC, the APC may determine whether the number of terminals having signal strength equal to or smaller than a first threshold value satisfies a preconfigured second threshold value in operation S320. The signal strength may be RSSI. For example, the second threshold value may be the number of preconfigured terminals. For example, when the number of terminals having signal strength equal to or smaller than a first threshold value is greater than the second threshold value, the second threshold value may be determined to be satisfied. Meanwhile, in operation S320, the APC receives RSSI related information from the AP and may determine whether the second threshold value is satisfied. Moreover, the AP directly determines whether the number of terminals having RSSI equal to or smaller than the first threshold value satisfies the second threshold value, and transmits a result of the determination to the APC. In this case, the APC may determine, based on information received from the AP, whether the second threshold value is satisfied.

In the period of CHDC, the APC may determine whether the ratio of terminals having signal strength equal to or smaller than a third threshold value satisfies a preconfigured fourth threshold value S330. The signal strength may be RSSI. For example, the fourth threshold value may be the ratio of the preconfigured terminal. The ratio herein signifies the ratio of the terminal satisfying the fourth threshold value against the entire terminals in a service by the AP. For example, when the ratio of the terminal having signal strength equal to or smaller than a third threshold value is greater than the preconfigured fourth threshold value, the fourth threshold value may be determined to be satisfied.

Meanwhile, FIG. 3 illustrates that operation S330 is performed after operation S320 is performed, but operation S320 may be performed after operation S330 is performed. In addition, only one operation in operations S320 and S330 may be performed.

In operations S320 and/or S330, when the second threshold value or the fourth threshold value is satisfied, operation S340 may be performed. When the operations S320 and/or S330 satisfy a threshold condition, a coverage hole is determined to be detected. With regard to an AP satisfying a threshold value condition, the APC may control a transmission power of the corresponding AP or that of an adjacent AP in operation S340. If the problem is caused by a low transmission power of the corresponding AP itself, the transmission power of the corresponding AP can be increased. In this case, it is determined that the corresponding AP does not operate normally and the transmission power of the adjacent AP may be increased to make up for the coverage of the AP determined to operate abnormally. When the transmission power of the adjacent AP is increased, the transmission power of one AP may be increased and the transmission power of a plurality of adjacent APs may be increased. The APC may transmit, to the corresponding to AP, a message to indicate increasing the transmission power of the corresponding AP. The AP which received the message from the APC may control the transmission power based on the received message.

Meanwhile, the message indicating controlling transmission power may include information about a transmission power control level. For example, with regard to the current transmission power of the AP, it is possible to indicate increasing the transmission power by a certain ratio. The transmission power control level may be determined based on the number of terminals having signal strength equal to or smaller than the threshold value or the ratio of terminals having signal strength equal to or smaller than the threshold value.

Meanwhile, the operations of S310, S320, S330, and S340 may be performed for each corresponding AP. The operations may be performed for all APs and may be performed for a part of APs according to the configuration of the APC. Using the method hereinabove, the coverage hole may be detected and the transmission power of the AP may be controlled. In this way, a WLAN network can be efficiently managed.

Meanwhile, an enterprise WLAN system may include an APC and a plurality of APs. The number of APs may be in the range from tens to thousands depending on the size of a user. An AP may be installed in a static place like an office and also may be installed in a common place with a large floating population like a lobby, a walkway, stairs, a wall, near an elevator, and so forth. There are a number of terminals connected to an AP installed in such an extreme common area, but the terminals are connected for a moment and disappear most of the time, and since there are many cases that the signal strength of a terminal suddenly drops down below the threshold value, the threshold condition of operations S320 and S330 of FIG. 3 is often satisfied and thus a CHDC may occur frequently. This AP may be defined as an edge AP.

A CHDC may occur frequently due to the characteristics of the place where the AP is located, even without any problem in an edge AP. A CHDC performed due to a problem having occurred to a certain AP may be advantageous to a system. However, when a CHDC is frequently performed even without any problem in an AP, an interference between adjacent APs may occur by unnecessary transmission power increase. In this case, a vicious cycle in which the transmission power is lowered by an optimization module to reduce the interference and then increased by the CHDC may occur. In order to prevent this vicious cycle from happening, a method may be used to prevent a CHDC operation from being performed for a normal AP satisfying a CHDC condition.

The following embodiment of the present disclosure describes a method for identifying a location of a normally operating AP in which signal strength of a terminal is inevitably and abruptly reduced, and controlling a CHDC generated in the dummy AP and an AP related to the dummy AP.

An embodiment of the present disclosure provides a method for identifying a location of a dummy AP in which signal strength of a terminal is inevitably and abruptly reduced in a WLAN system (for example an enterprise WLAN system) using a plurality of WLAN APs, and controlling a CHDC operation. For example, a problem caused by frequent occurrence of a CHDC in a normal AP can be solved by controlling to prevent the CHDC from occurring.

Figure 4:
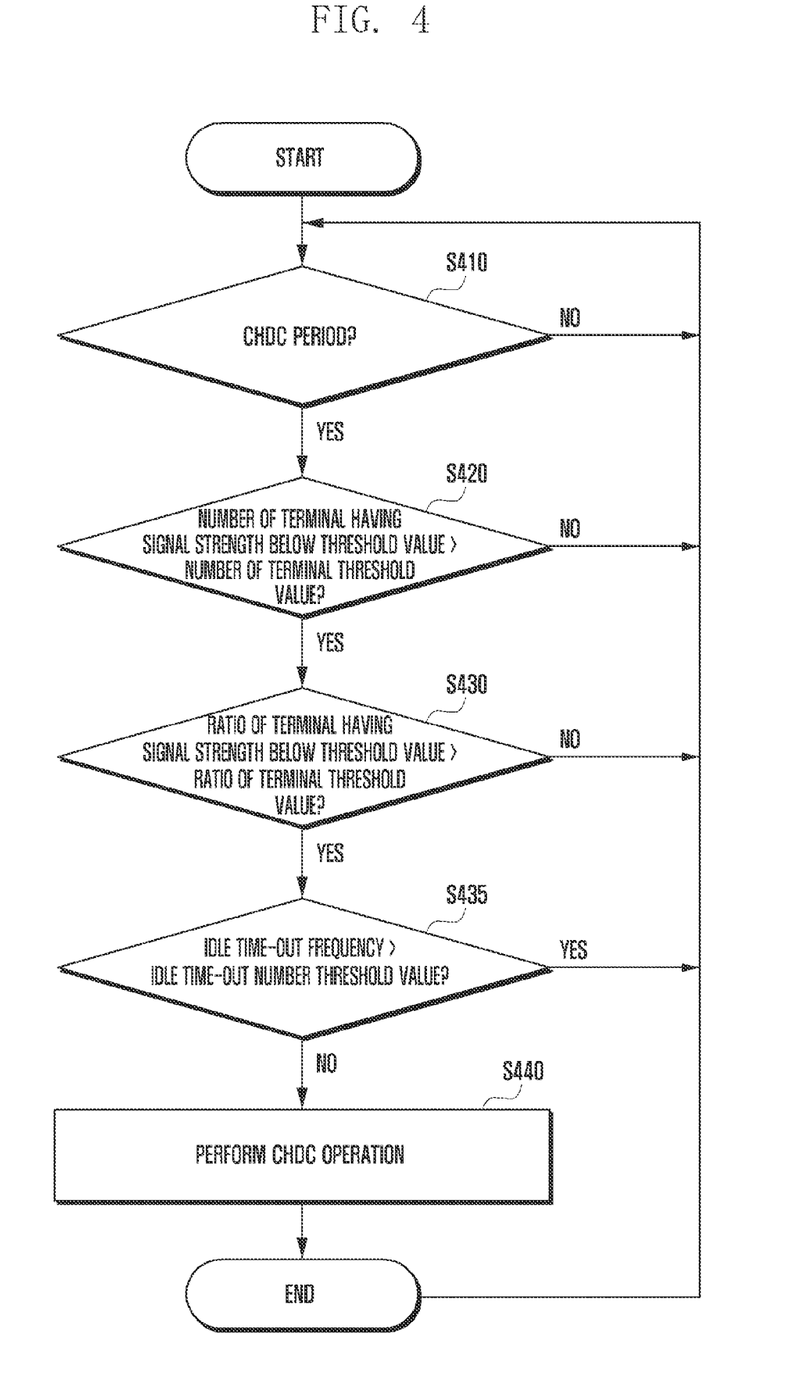
FIG. 4 illustrates a coverage hole detection and correction (CHDC) related operation control method according to an embodiment of the present disclosure.

FIG. 4 illustrates a CHDC related operation control method according to an embodiment of the present disclosure.

Referring to FIG. 4, when a wireless environment changes according to an embodiment of the present disclosure, a method for controlling a CHDC related operation of an AP is described.

An APC determines whether it is in a period of a CHDC in S410. The period may be preconfigured by the APC. In addition, the period may be configured by an AP connected to the APC. Since the APC performs the following operation in the preconfigured period, an efficient system operation is available. Meanwhile, although the present disclosure provided the description for performing the CHDC related operation in the preconfigured period for an efficient system operation, the scope of the present disclosure is not limited thereto. That is, the CHDC related operation may be performed non-periodically. For example, when the AP detects a certain event and reports about a wireless environment, the following CHDC related operation may be performed.

In the period of CHDC, the APC may determine whether a preconfigured CHDC condition is satisfied. The CHDC condition may include at least one of the conditions of operations S420 or S430. The APC may determine whether the number of terminals having signal strength equal to or smaller than a first threshold value satisfies a preconfigured second threshold value in operation S420. The signal strength may be RSSI. For example, the second threshold value may be the number of preconfigured terminals. For example, when the number of terminals having signal strength equal to or smaller than a first threshold value is greater than the second threshold value, the second threshold value may be determined to be satisfied. Meanwhile, in operation S420, the APC receives RSSI related information from the AP and may determine whether the second threshold value is satisfied. Moreover, the AP directly determines whether the number of terminals having RSSI equal to or smaller than the first threshold value satisfies the second threshold value, and transmits a result of the determination to the APC. In this case, the APC may determine, based on information received from the AP, whether the second threshold value is satisfied.

In addition, in the period of CHDC, the APC may determine whether the ratio of terminals having signal strength equal to or smaller than a third threshold value satisfies a preconfigured fourth threshold value in operation S430. The signal strength may be RSSI. For example, the fourth threshold value may be the ratio of the preconfigured terminal. The ratio herein signifies the ratio of the terminal satisfying the fourth threshold value against the entire terminals in a service by the AP. For example, when the ratio of the terminal having signal strength equal to or smaller than a third threshold value is greater than the preconfigured fourth threshold value, the fourth threshold value may be determined to be satisfied. Meanwhile, in operation S430, the APC receives, from the AP, information associated with the number of the terminals having the signal strength equal to or smaller than the third threshold value, and may determine whether the fourth threshold value may be satisfied. Moreover, the AP directly determines whether the number of terminals satisfying the third threshold value satisfies the fourth threshold value, and transmits a result of the determination to the APC. In this case, the APC may determine whether the fourth threshold value is satisfied based on information received from the AP.

Meanwhile, FIG. 4 illustrates that operation S430 is performed after operation S420 is performed, but operation S420 may be performed after operation S430 is performed. In addition, only one operation in the operations of S420 and S430 may be performed. This can be applied to the various embodiments of the present disclosure in the same way.

In operations S420 and/or S430, when the second threshold value or the fourth threshold value is satisfied, operation S435 may be performed. Meanwhile, an embodiment of the present disclosure of FIG. 4 illustrated that operation S435 is performed after operations of S420 and S430, but the scope of the present disclosure is not limited thereto and operation S435 may be performed before operations of S420 and S430.

The APC may determine, for at least one AP, whether the number of occurrences of disconnection from a terminal without a handover events satisfies the threshold condition in operation S435. The terminal may perform a handover from a certain AP to another AP based on mobility, but when a wireless environment abruptly changes, the handover may fail. When the terminal is disconnected from the AP without a handover, an idle time-out may occur. The APC may configure a threshold condition for the number of idle time-out occurrences.

With respect to the threshold condition, the number of idle time-out occurrences may be configured for the configured time condition. For example, when the time condition is configured as 24 hours and the frequency condition is configured as 10 times, a reference to determine satisfaction of the condition is to identify whether an idle time-out occurred at least 10 times within 24 hours in a certain AP. Meanwhile, the frequency condition may be determined by the ratio of total terminal numbers connected to the certain AP, during the configured time. For example, n % of the total number of connected terminals during the configured time may be configured as the frequency condition.

When the certain AP satisfies the threshold condition in operation S435, the AP satisfying the condition is not a suitable AP to perform a CHDC related operation. Therefore, the AP and an AP related to the AP do not perform a CHDC related operation. That is, a transmission power control operation is not performed. Accordingly, the APC moves back to operation S140 to repeat the operation for another AP.

When the certain AP does not satisfy the threshold condition in operation S435, the AP not satisfying the condition is a suitable AP to perform a CHDC related operation. Therefore, the AP and an AP related to the AP may perform a CHDC related operation S440. The CHDC related operation may be an operation to control a transmission output or a transmission power of the AP. That is, a coverage hole is determined to have been generated, and the related AP may control the transmission power.

The transmission power control may be associated with the AP satisfying the threshold condition and an AP related to the AP, in operation S435. An AP related to the AP may be an AP capable of covering the coverage of the AP through increasing the transmission power. When configuring a WLAN system using a plurality of APs, parts of coverage may be designed to overlap between each AP. By designing coverages to overlap, when a problem occurs in a certain AP, another AP having overlapped coverage may control to make up for the coverage of the AP having a problem.

With respect to an AP satisfying a threshold value condition, an APC may control a transmission power of the corresponding AP or that of an adjacent AP S440. If the problem is caused by a low transmission power of the corresponding AP itself, the transmission power of the corresponding AP may be increased. In this case, it is determined that the corresponding AP does not operate normally and the transmission power of the adjacent AP may be increased to make up for the coverage of the AP which has been determined to operate abnormally. When the transmission power of the adjacent AP is increased, the transmission power of one AP may be increased and the transmission power of a plurality of adjacent APs may be increased. The APC may transmit, to the corresponding AP, a message to indicate increasing the transmission power of the corresponding AP. The AP may control the transmission power or a transmission output based on the message received from the AP controller.

Meanwhile, the message indicating controlling the transmission power may include information about a transmission power control level. For example, with regard to the current transmission power of the AP, it is possible to indicate controlling the transmission power by a certain ratio. The transmission power control level may be determined based on the number of terminals having signal strength equal to or smaller than the threshold value or the ratio of terminals having signal strength equal to or smaller than the threshold value.

Figure 5:
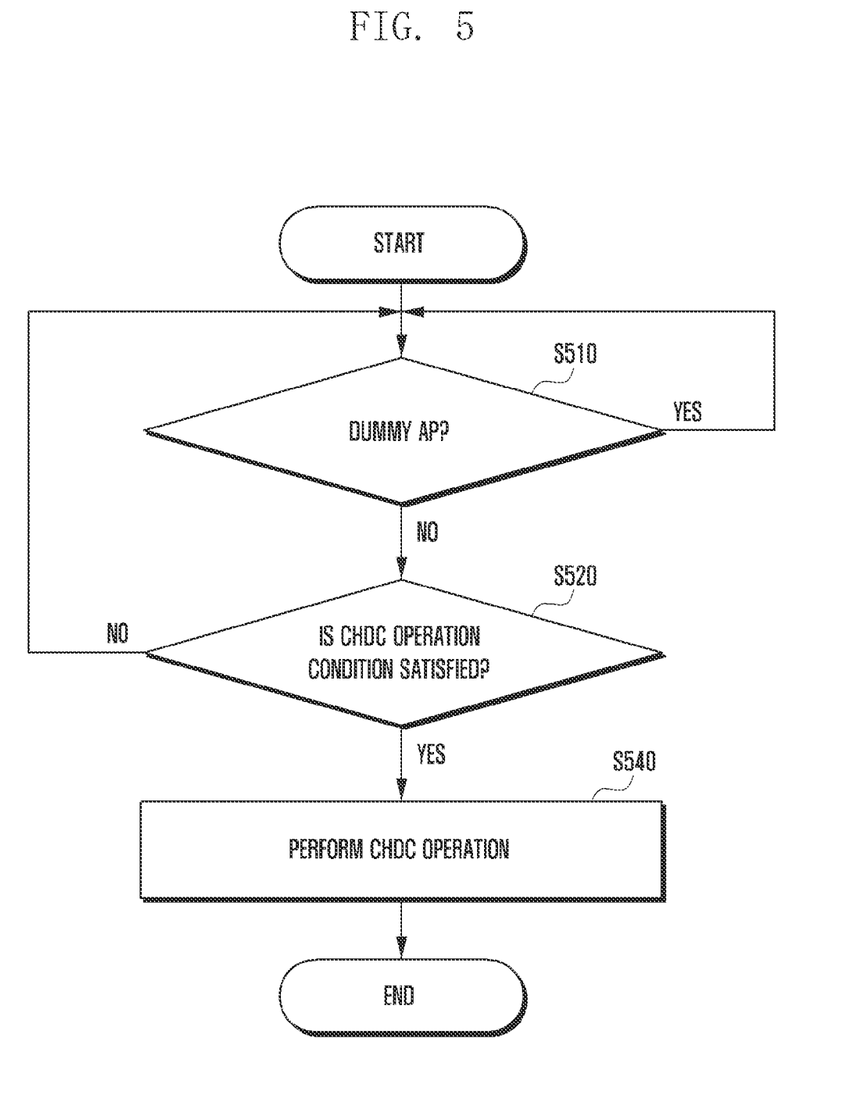
FIG. 5 illustrates a CHDC related operation control method according to an embodiment of the present disclosure.

FIG. 5 illustrates a CHDC related operation control method according to another embodiment of the present disclosure.

Referring to FIG. 5, an APC may determine whether at least one AP is a dummy AP in operation S510. A method to determine a dummy AP is set forth in FIG. 4. When a disconnection frequency of a terminal connected to an AP, a disconnection frequency of the terminal without a handover, and an idle time-out occurrence frequency satisfy a configured threshold condition, an AP may be determined to be a dummy AP. Meanwhile, the APC may determine whether the threshold condition is satisfied by receiving information about the frequency of disconnection of the terminal from the AP. In addition, the APC may only receive information about the frequency of disconnection of the terminal from the AP. Further, each AP may determine whether the threshold condition is satisfied and the APC may receive, from the AP, indication information indicating whether each AP is a dummy AP.

When an AP is determined to be a dummy AP, a CHDC operation is not performed with respect to the AP determined to be a dummy AP and an AP related to the dummy AP. Therefore, operation S520 is not proceeded. The APC may perform operation S510 for another AP. With respect to a dummy AP, since it is inefficient to perform a CHDC, in the present embodiment of the present disclosure, an AP is first determined whether it is a dummy AP, and when it is determined to be a dummy AP, a CHDC related operation is not performed.

When an AP is determined not to be a dummy AP, operation S520 proceeds. In operation 520, the APC may determine whether an AP satisfies a CHDC operation condition. The CHDC operation condition may be the threshold value condition described in operations S420 and S430. The satisfaction of the CHDC operation condition may be determined according to the number of terminals having signal strength equal to or smaller that the threshold value and the ratio of terminals. Since the determination method is set forth in more detail in FIG. 4, refer to FIG. 4 for the description.

If a CHDC operation condition is not satisfied, an APC returns to operation S510 and performs the process for another AP. When the CHDC operation condition is satisfied, operation S540 proceeds. The APC may control an AP to perform the CHDC operation S540. The APC may transmit a control message for performing the CHDC operation to the AP. The AP received the control message may perform an operation corresponding to the control message. The AP may control a transmission power corresponding to the control message. The APC may transmit a CHDC control message with respect to an AP related to the AP satisfying the threshold condition in operation S520 as well as transmit a CHDC control message with respect to the AP having performed the operation. In this case, a control message transmitted to each AP may differ. That is, a control message to indicate increasing a transmission power may be transmitted to an AP while a control message to indicate decreasing a transmission power may be transmitted to another AP. Although control messages have the same type of direction to increase a transmission power, the ratio may be different.

Figure 6:
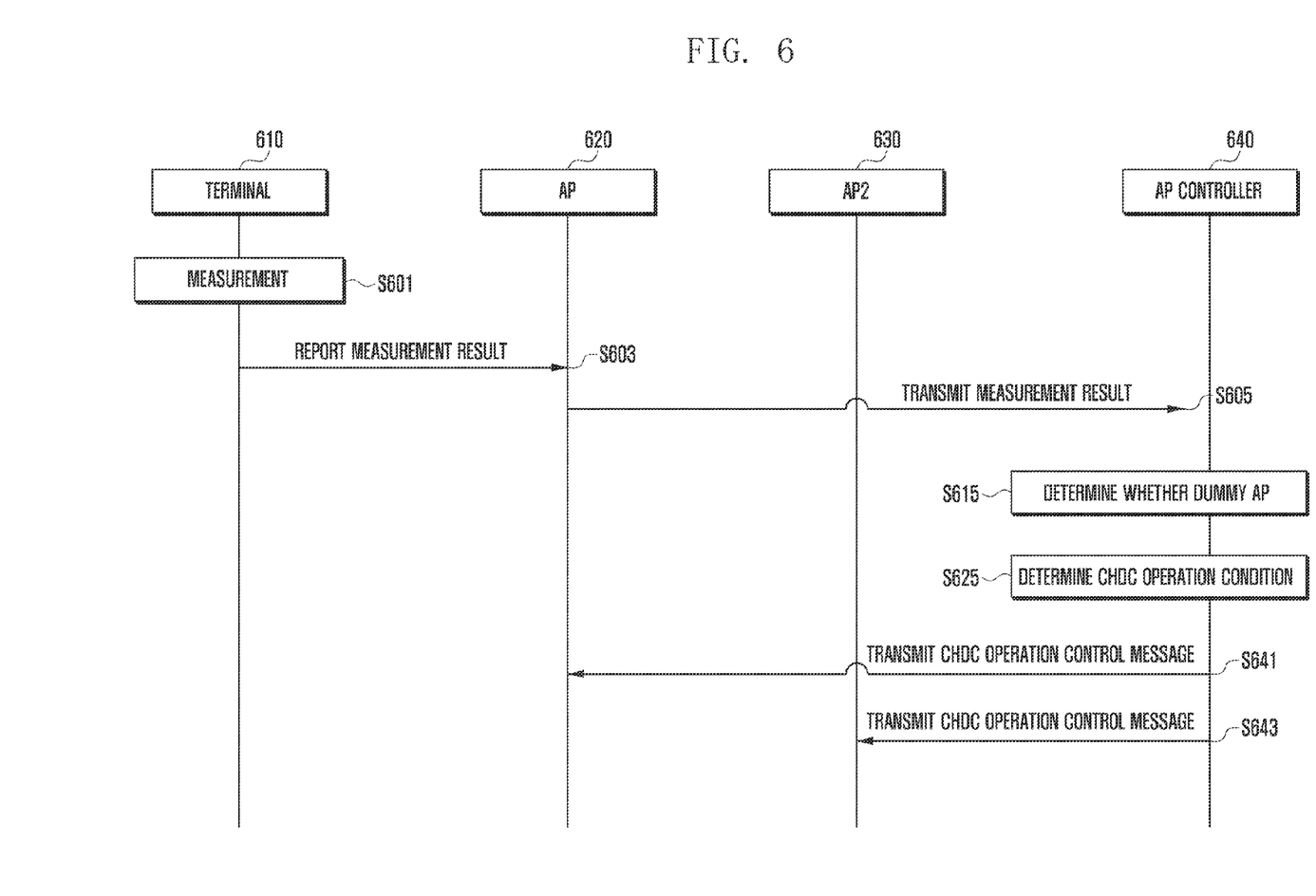
FIG. 6 illustrates a relationship between each entity according to an embodiment of the present disclosure.

FIG. 6 illustrates a relationship between each entity according to an embodiment of the present disclosure.

Referring to FIG. 6, a system of the present disclosure may include a terminal 610, an AP 620, an AP 2 630, and an APC 640. A plurality of terminals may be connected to the AP in the system. Two or more APs may be connected to the APC 640.

The terminal 610 may perform a measurement with respect to a wireless environment S601. The terminal may measure signal strength received from the AP. The terminal 610 may measure signal strength received from the wirelessly connected AP 620. In addition, the terminal 610 may measure signal strength received from another AP.

The terminal 610 may transmit a measurement result to an AP 620 providing a service to the terminal in operation S603. Although not shown in the figure, the AP 2 630 may also receive a measurement result from the terminal connected thereto. Meanwhile, the terminal may perform the measurement report periodically. In addition, when there is a request from the AP or when a specific event occurs, the measurement report may be performed non-periodically.

The AP 620 may transmit the measurement result to the APC 640 based on the measurement report received from the terminal in operation S605. In this case, the AP 620 may transmit data, as it is, included in the measurement report received from the terminal to the APC 640, determine whether a threshold condition is satisfied based on the measurement report received from the terminal, and transmit a result of the determination to the APC. When the AP 620 only transmits the data included in the measurement report, the APC 640 may determine the satisfaction of the threshold condition set forth in operations S510 and S520 in FIG. 5.

When the AP 620 directly determines the threshold condition and reports a result of the determination, the AP 620 may determine the threshold conditions of operations S510 and S520, and transmit a message for indicating the result of the determination to the APC 640.

The APC 640 may determine, based on the message received from the AP 620, whether the AP 620 is a dummy AP in operation S615. When an AP 620 transmits the message to indicate whether it is a dummy AP, the APC 640 may make a determination based on the message. When the AP 620 reports only a frequency of disconnection (a frequency of disconnection without a handover and a frequency of idle time-out occurrence), a dummy AP may be determined based on such information. When the AP 620 is a dummy AP, a CHDC related operation is not performed after that time. When the AP 620 is not a dummy AP, a CHDC related operation is performed. On the other hand, after determining the condition of a CHDC related operation, whether it is a dummy AP may be determined.

The APC 640 may determine whether a CHDC operation condition is satisfied in operation S625. After the AP 620 determines the CHDC operation condition, when information indicating whether the CHDC operation condition is satisfied is transmitted, the APC 640 may determine that the CHDC operation condition is satisfied based on the indication information to be received. When the AP 620 transmits only a measurement report received from the terminal, the APC 640 may determine whether the CHDC operation condition is satisfied based on the received measurement report.

When the CHDC operation condition is not satisfied, the CHDC process for the AP 620 is terminated. The process for another AP may be re-performed. When the AP 620 satisfies the CHDC operation condition, a control message for the CHDC operation is generated and the control message may be transmitted to the AP 620 and/or the AP 2 630 in operations S641 and S643. The APC 640 may control the APs 620 and 630 to perform the CHDC operation. The AP which has received a control message may perform an operation corresponding to the control message. The APs 620 and 630 may control a transmission power corresponding to the control message. In this case, the AP 620 is the AP according to determinations of the dummy AP threshold condition and CHDC operation threshold condition, and AP 2 630 may be an AP related to the AP 620 or an adjacent AP. The AP 2 630 may be an AP capable of covering the coverage of the AP 620 by increasing a transmission power. The AP 620 and the AP 2 630 may be adjacent APs having parts of coverages overlapping each other, and when a coverage hole is generated in the contacting AP, the transmission power may be increased to make up for the coverage hole.

Figure 7:
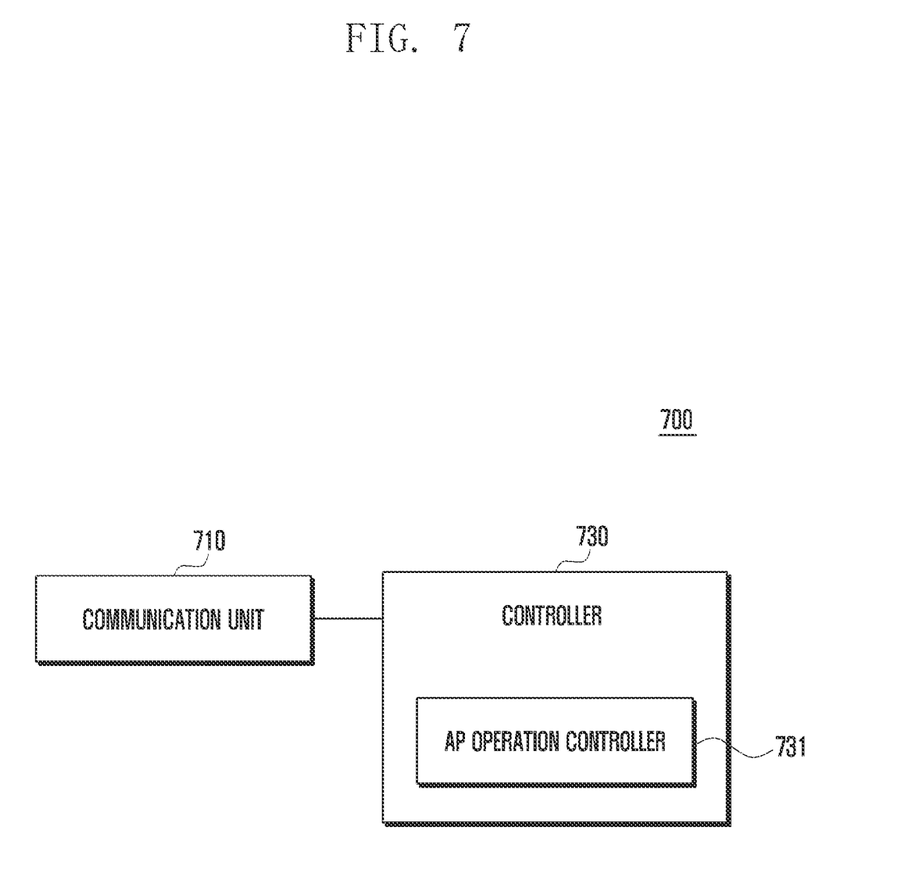
FIG. 7 illustrates an access point controller (APC) according to an embodiment of the present disclosure.

FIG. 7 illustrates an APC according to an embodiment of the present disclosure.

The APC 700 may include a communication unit 710 for performing a communication with at least one network node, and a controller 730 for controlling overall operations of the APC 700.

An embodiment of the present disclosure may additionally include an AP operation controller 731. The AP operation controller 731 may control an operation of an AP connected to the APC 700. The AP operation controller 731 may determine whether the AP performs a CHDC operation based on information received from the AP, and transmit a control message for performing the CHDC operation to the corresponding AP, according to a result of the determination.

In addition, according to an embodiment of the present disclosure, the AP operation controller 731 may receive connection related information with respect to the AP and at least one terminal, based on the connection related information, determine whether the AP is a dummy AP, and based on a result of the determination, control to perform a CHDC related operation for the AP. In this case, the connection related information may include at least one of information on the number of times of disconnection between the AP and the terminal in service, information on the number of times of disconnection between the AP and the terminal in service without a handover or information on the number of times of idle time-out occurrence in the AP.

Also, based on the determination on whether a disconnection event between the AP and the terminal in service, which satisfies a configured threshold condition, has occurred during a pre-configured time, the AP operation controller 731 may control to determine whether the AP is a dummy AP.

Also, when the AP is a dummy AP, the AP operation controller 731 may control to prevent the AP from performing the CHDC related operation. Particularly, when the AP is a dummy AP, with respect to the CHDC operation, the AP operation controller may control to prevent the AP from changing a transmission power for the AP and an AP adjacent to the AP.

Also, the APC 731 may control to receive, from the AP, indication information indicating whether the AP is a dummy AP, and determine whether the AP is a dummy AP, based on the indication information.

Also, the APC 731 may control to receive, from the AP, indication information indicating whether the AP is a dummy AP, and determine whether the AP is a dummy AP, based on the indication information. In addition, when the AP satisfies a CHDC related condition, the AP operation controller 731 may control to adjust a transmission power for the AP or an AP adjacent to the AP.

Hereinabove, an APC 700 according to an embodiment of the present disclosure has been described in a separate block. This is only for the convenience of description and thus the embodiment of the present disclosure does not limit the configuration of the APC 700 thereto. For example, an operation of the AP operation controller 731 may be performed by the controller 730. Meanwhile, the operation of the APC 700 is not limited to the description in FIG. 7 and, in addition, may include the operation of the APC according to various embodiments of the present disclosure set forth through FIG. 1 to FIG. 6. Further, the controller 730 or the AP operation controller 731 may control to perform the operation of the APC set forth in the FIG. 1 to FIG. 6.

Figure 8:
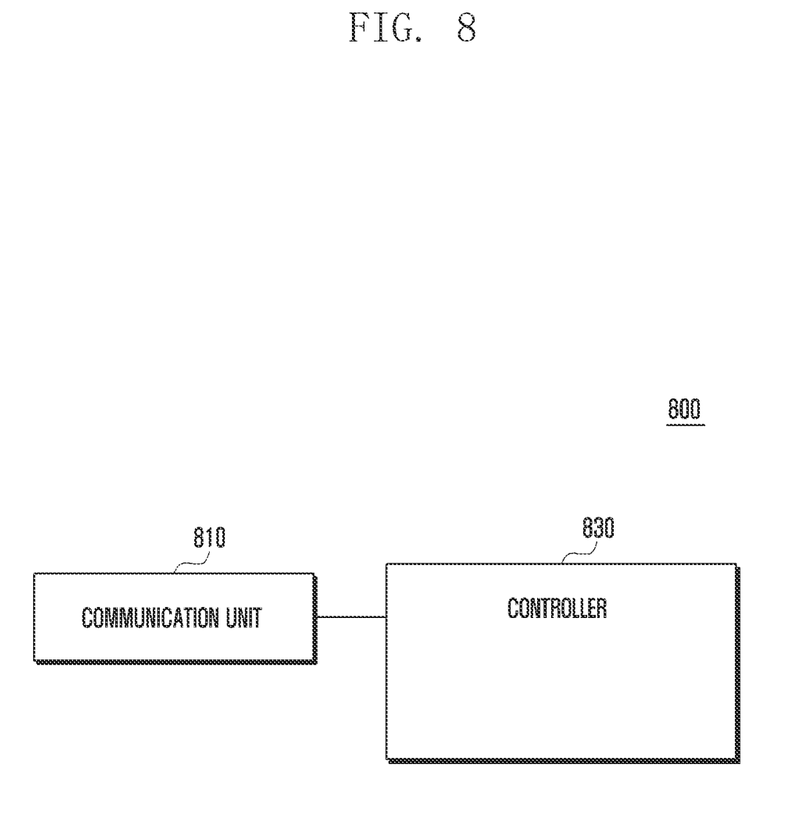
FIG. 8 illustrates an AP according to an embodiment of the present disclosure.

FIG. 8 illustrates an AP according to an embodiment of the present disclosure.

Referring to FIG. 8, an AP 800 may include a communication unit 810 for performing a communication with at least one network node and a controller 830 for controlling overall operations of the AP 800.

According to an embodiment of the present disclosure, the controller 830 may control to receive a measurement report from at least one terminal by the AP 800. The controller 830 may control to transmit a measurement result to an APC. In addition, the controller 830 may control the operation of the AP based on a control message received from the APC.

The controller 830 may store connection related information for at least one terminal associated with the AP, based on the connection related information, determine whether the terminal is a dummy AP, and based on a result of the determination, control to transmit information for indicating whether the AP is a dummy AP, to the APC. In this case, the connection related information may include at least one of information on the number of times of disconnection between the AP and the terminal in service, information on the number of times of disconnection between the AP and the terminal in service without a handover or information on the number of times of idle time-out occurrence in the AP.

In addition, based on the determination on whether a disconnection event between the AP and the terminal in service, which satisfies a configured threshold condition, has occurred during a pre-configured time, the controller 830 may control to determine whether the AP is a dummy AP.

Further, when the AP is a dummy AP, the controller 830 may control to prevent a CHDC related operation from being performed, and when the AP is not a dummy AP, the controller 830 may control to perform the CHDC related operation based on measurement information received from the terminal.

Hereinabove, an AP 800 according to an embodiment of the present disclosure has been described in a separate block. This is for the convenience of description and thus the embodiment of the present disclosure does not limit the configuration of the AP 800 thereto. Meanwhile, the operation of the AP 800 is not limited to the description in FIG. 8 and besides may include the operation of the AP according to the various embodiments of the present disclosure set forth through FIG. 1 to FIG. 6. Further, the controller may control to perform the operation of the AP set forth in the FIG. 1 to FIG. 6.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An access point (AP) operation control method of an AP controller (APC) in a wireless local area network (WLAN) system, the method comprising:
   receiving disconnection related information between an AP and at least one terminal;
   determining whether a number of disconnection events occurred between the AP and the at least one terminal without a handover during a pre-configured time is greater than a pre-configured threshold based on the disconnection related information;
   determining that the AP is a dummy AP if the number of disconnection events is greater than the pre-configured threshold; and
   if the AP is not the dummy AP, performing a coverage hole detection and correction (CHDC) related operation for the AP.

2. The method of claim 1, wherein the disconnection related information comprises at least one of information on the number of disconnection events, or information on a ratio of occurrences of the disconnection events in the AP.

3. The method of claim 1, wherein if the AP is the dummy AP, the CHDC related operation is not performed for the AP.

4. The method of claim 1, wherein if the AP is the dummy AP, a transmission power for the AP and that of another AP that is adjacent to the AP is not changed in relation to the CHDC operation for the AP.

5. The method of claim 1, further comprising:
   receiving, from the AP, indication information that indicates whether the AP is the dummy AP; and
   based on the indication information, determining whether the AP is the dummy AP.

6. The method of claim 1, further comprising, if the AP is not the dummy AP, determining whether the AP satisfies a CHDC related operation condition based on signal strength information between the AP and the at least one terminal.

7. The method of claim 6, wherein, when the AP satisfies the CHDC related condition, the performing of the CHDC related operation comprises controlling a transmission power associated with at least one of the AP or another AP that is adjacent to the AP.

8. An apparatus of an access point (AP) controller for controlling an AP operation in a wireless local area network (LAN) system, the apparatus comprising:
   a communication device configured to perform a communication with at least one AP; and
   at least one processor configured to:
      control the communication device to receive disconnection related information between an AP and at least one terminal,
      determine whether a number of disconnection events occurred between the AP and the at least one terminal without a handover during a pre-configured time is greater than a pre-configured threshold based on the disconnection related information,
      determine that the AP is a dummy AP if the number of disconnection events is greater than the pre-configured threshold, and
      control to perform a coverage hole detection and correction (CHDC) related operation for the AP if the AP is not the dummy AP.

9. The apparatus of claim 8, wherein the disconnection related information comprises at least one of information on the number of disconnection events, or information on a ratio of occurrences of the disconnection events in the AP.

10. The apparatus of claim 8, wherein the at least one processor is further configured to, if the AP is the dummy AP, control to prevent the CHDC related operation from being performed for the AP.

11. The apparatus of claim 8, wherein the at least one processor is further configured to, if the AP is the dummy AP, control to prevent a transmission power of the AP and that of another AP that is adjacent to the AP from being changed in relation to the CHDC operation for the AP.

12. The apparatus of claim 8, wherein the at least one processor is further configured to:
   receive, from the AP, indication information that indicates whether the AP is the dummy AP, and
   determine whether the AP is the dummy AP based on the indication information.

13. The apparatus of claim 8, wherein the at least one processor is further configured to, if the AP is not the dummy AP, control the AP to determine whether the AP satisfies a CHDC related operation condition based on signal strength information between the AP and the at least one terminal.

14. The apparatus of claim 13, wherein the at least one processor is further configured to, when the AP satisfies the CHDC related condition, control to adjust a transmission power associated with at least one of the AP or another AP that is adjacent to the AP.

15. An access point (AP) operation method in a wireless local area network (WLAN) system, the method comprising:
   storing disconnection related information with respect to at least one terminal related to an AP;
   determining whether a number of disconnection events occurred between the AP and the at least one terminal without a handover during a pre-configured time is greater than a pre-configured threshold based on the disconnection related information; and if the number of disconnection events is not greater than the pre-configured threshold, transmitting, to an AP controller (APC), information indicating that the AP is not a dummy AP, wherein the APC is configured to perform a coverage hole detection and correction (CHDC) related operation for the AP in response to receive the information indicating that the AP is not the dummy AP.

16. The method of claim 15, wherein the disconnection related information comprises at least one of information on the number of disconnection events, or information on a ratio of occurrences of the disconnection events in the AP.

17. The method of claim 15, wherein the CHDC related operation is not performed when the AP is the dummy AP.

18. An apparatus of an access point (AP) on a wireless local area network (WLAN) system, the apparatus comprising:

a communication device configured to perform a communication with at least one network node; and at least one processor configured to:

receive disconnection related information with respect to at least one terminal related to the AP, determine whether a number of disconnection events occurred between the AP and the at least one terminal without a handover during a pre-configured time is greater than a pre-configured threshold based on the disconnection related information, and control the communication device to transmit information indicating that the AP is not a dummy AP to an AP controller (APC) if the number of disconnection events is not greater than the pre-configured threshold, wherein the APC is configured to perform a coverage hole detection and correction (CHDC) related operation for the AP in response to receive the information indicating that the AP is not the dummy AP.

19. The apparatus of claim 18, wherein the disconnection related information comprises at least one of information on the number of disconnection events, or information on a ratio of occurrences of the disconnection events in the AP.

20. The apparatus of claim 18, wherein the at least one processor is further configured to:

prevent the CHDC related operation when the AP is the dummy AP.

* * * * *